United States Patent
Calciu

(10) Patent No.: US 9,541,944 B2
(45) Date of Patent: Jan. 10, 2017

(54) DEVICE FOR MOUNTING A PEDAL OF A MOTOR VEHICLE

(71) Applicant: RENAULT s.a.s., Boulogne-Billancourt (FR)

(72) Inventor: Catalin Nicusor Calciu, Bucharest (RO)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/418,665

(22) PCT Filed: Jun. 10, 2013

(86) PCT No.: PCT/FR2013/051331
§ 371 (c)(1),
(2) Date: Jan. 30, 2015

(87) PCT Pub. No.: WO2014/020248
PCT Pub. Date: Feb. 6, 2014

(65) Prior Publication Data
US 2015/0192948 A1   Jul. 9, 2015

(30) Foreign Application Priority Data
Aug. 1, 2012  (FR) ...................... 12 57473

(51) Int. Cl.
*G05G 1/32* (2008.04)
*B60T 7/06* (2006.01)
(Continued)

(52) U.S. Cl.
CPC ................. *G05G 1/32* (2013.01); *B60R 21/09* (2013.01); *B60T 7/065* (2013.01); *F16D 9/06* (2013.01);
(Continued)

(58) Field of Classification Search
CPC .......... B60T 7/065; G05G 1/32; G05G 1/327; B60R 21/09; Y10T 74/20888; Y10T 74/20528
See application file for complete search history.

(56) References Cited

U.S. PATENT DOCUMENTS 6,742,411 B2 *  6/2004  Aoki ...................... B60T 7/065
                                                          74/512
2013/0000440 A1    1/2013  Bushong

FOREIGN PATENT DOCUMENTS

EP   0 965 506   12/1999
EP   2 540 579   1/2013
(Continued)

OTHER PUBLICATIONS

French Search Report Issued Apr. 8, 2013 in Application No. 1257473 Filed Aug. 1, 2012.
(Continued)

*Primary Examiner* — Thomas Diaz
(74) *Attorney, Agent, or Firm* — Oblon, McClelland, Maier & Neustadt, L.L.P.

(57) ABSTRACT

A device for mounting a pedal of a vehicle including a support on which the pedal is mounted by a principal rotary shaft and a shearing mechanism connected to a fixed bodywork element of the vehicle, the shearing mechanism configured to radially shear off the principal shaft in a case of a displacement of the support relative to the bodywork element, to detach the pedal from the support. A secondary shaft is fixed to the pedal and is configured to position the pedal, which has been sheared off, in a new operating position.

10 Claims, 2 Drawing Sheets

(51) Int. Cl.
  *B60R 21/09*  (2006.01)
  *G05G 1/327*  (2008.04)
  *F16D 9/06*  (2006.01)
  *G05G 1/44*  (2008.04)

(52) U.S. Cl.
  CPC ............... *G05G 1/327* (2013.01); *G05G 1/44* (2013.01); *Y10T 74/20528* (2015.01)

(56) References Cited

FOREIGN PATENT DOCUMENTS

FR    2 838 695    10/2003
WO    2012 146403  11/2012

OTHER PUBLICATIONS

International Search Report Issued Oct. 14, 2013 in PCT/FR13/051331 Filed Jun. 10, 2013.

* cited by examiner

DEVICE FOR MOUNTING A PEDAL OF A MOTOR VEHICLE

BACKGROUND

The invention relates to a device for mounting an actuating pedal on a vehicle. Generally, a conventional motor vehicle is provided with different actuating pedals, such as for example a brake pedal or a clutch pedal, located in the region of the feet of the driver and emerging in a free space located in front of the driver's seat. Apart from carrying out their function in a consistent and accurate manner, said pedals have to be mounted in the vehicle whilst at the same time respecting certain safety rules, in particular as regards the driver. The invention relates more particularly to a device for mounting an actuating pedal, taking into consideration the safety of the driver in the event of a front impact, for example.

Devices for mounting an actuating pedal in a motor vehicle exist and have already been the subject of patents. For example, the patent EP0965506 may be cited, said patent relating to a device for mounting a pedal, the principle thereof consisting in implementing a shearing device provided to detach the pedal from its support in the case of a partial intrusion of the front end into the passenger compartment, following an impact. More specifically, the pedal is fixed to its support by means of a rotary shaft and the shearing device is secured to a fixed element of the vehicle to cut the two ends of the shaft of the pedal when said support penetrates said passenger compartment under the impact of a collision. By this means, during an accident the path of the pedal, which is initially linked to the support in terms of movement, is halted very early on, thus preventing the legs of the driver being struck in a dangerous manner.

SUMMARY

However, with this type of device for mounting, there is the not inconsiderable risk of the shearing device being triggered inadvertently for no apparent reason, whilst the vehicle is in a normal driving phase and without being subjected to any specific impact. The pedal would then become detached from its support without the driver being able to benefit from the usual function of said pedal, such as a braking or clutch function, for example. Even if the probability of seeing such a phenomenon occurring remains minimal, the consequences thereof could prove very serious in terms of injury to the body and/or damage to equipment. Thus it becomes necessary to secure the existing devices for mounting the pedal in order to prevent such potentially dangerous phenomena from occurring.

The methods for mounting a pedal on a motor vehicle according to the invention are designed to permit the pedal, which would thus be detached from its support, to preserve at least partially its functional integrity, whether in a normal driving situation or accident situation. In this manner, a driver who is surprised not to be able to actuate the brake pedal or the clutch pedal normally could still rescue the situation by exerting pressure from the foot on the faulty pedal, so as to obtain the desired function.

The invention relates to a device for mounting a pedal of a vehicle comprising a support on which the pedal is mounted by means of a principal rotary shaft and shearing means connected to a fixed bodywork element of said vehicle, said shearing means being capable of radially shearing off said principal shaft in the case of a displacement of said support relative to said bodywork element, in order to detach said pedal from said support. The principal feature of a device for mounting according to the invention is that it comprises a secondary shaft which is fixed to the pedal and is capable of positioning the pedal, which has been sheared off, in a new operating position. It is important to remember that an actuating pedal comprises a lever arm, one end thereof being terminated by a plate forming a bearing surface on which the driver exerts a thrust with the foot and the other end thereof being fixed to the principal rotary shaft. Thus, when said rotary shaft is sheared off, it is the entire pedal which is released from its support and which is thus able to be freely displaced. The secondary shaft contributes to placing the pedal, which has been sheared off, in a secondary position which at least partially enables it to provide its original function. It is assumed that the secondary operating position is different from the normal operating position. More specifically, the pedal is relocated in a position adjacent to that which it usually occupies and the possibility of being actuated by simple pressure from the foot of the driver will thus be maintained in order to provide its initial function. In this manner, the secondary shaft may constitute either a guide member which will enable the displacement of the sheared pedal to be oriented so that said pedal is placed in a new operating position or the new rotary shaft of said pedal which has been displaced following the shearing thereof. It should be mentioned that the secondary shaft is able to fulfil both of the aforementioned functions at the same time. The devices for mounting according to the invention have been initially developed for brake pedals mounted on a motor vehicle, as an unexpected malfunction of the braking system during a normal driving phase may have dramatic consequences on the occupants of the vehicle whilst a malfunction of the clutch may seem less serious.

Advantageously, the secondary shaft constitutes the new rotary shaft of the pedal in its new operating position. More specifically, once the pedal has been sheared off, the principal rotary shaft has become non-operational. Thus, since the pedal has been initially designed to operate by rotation, it has been necessary to find a rotary shaft for said pedal by substitution via this secondary rotary shaft.

Preferably, the secondary shaft is parallel to the principal shaft when the pedal is mounted in an articulated manner on the support. Since the pedal, which has been sheared off, may be pivoted about its secondary shaft and as its displacement following its shearing off in the event of an accident is carried out in a longitudinal plane of the vehicle, it is essential that said pedal maintains the same direction of rotation in order to continue to provide its initial function.

Preferably, the principal shaft joins two parallel and vertical walls of the support, each of said walls comprising an opening and the secondary shaft protruding into each of said openings. For this configuration, it is assumed that the secondary shaft penetrates into each of said openings and the movement permitting the pedal to reach its new operating position is made possible, in particular, by means of said openings which do not hamper the displacement of the secondary shaft. These openings may either be similar to guide slots which permit the directional sliding of the secondary shaft or be extended so as not to interfere with the displacement of the pedal in any direction.

Advantageously, each wall extends in a longitudinal direction of the vehicle, the principal shaft and the secondary shaft extending in a transverse direction of said vehicle. In this manner, the two shafts are perpendicular to the two walls, the displacement of the sheared-off pedal being carried out parallel to said walls, between said walls.

Advantageously, the openings of the walls are identical and oppose one another in a transverse direction of the vehicle. This configuration prevents the pedal from being located in an offset position and thus difficult to operate.

Preferably, each opening comprises a blocking end designed to receive the secondary shaft, once the principal shaft has been sheared off. More specifically, when a driver actuates the pedal which is sheared off, the secondary shaft is displaced in each opening so as to be blocked in the region of a tapered end of said openings. This end contributes to the fixing of the new operational position of the sheared-off pedal.

Preferably, the secondary shaft is located behind the principal shaft when the pedal is mounted on the support, the blocking end of each opening being located to the rear of said openings.

Advantageously, the principal shaft is made of plastics material and the secondary shaft is made of steel. More specifically, when the vehicle is subjected to a front impact it is important that the principal shaft may be sheared off easily so as to be instantly detached from the support. Conversely, the secondary shaft has to be durable and strong and provide no possibility of being broken off by external action as it constitutes the last resort in terms of safety.

The second subject of the invention is a pedal designed to be mounted on a motor vehicle support by means of a device for mounting according to the invention. The principal feature of a pedal according to the invention is that it comprises a secondary shaft. More specifically, since the secondary shaft is fixed in a non-removable manner to the pedal, it forms an integral part of said pedal. Said second shaft may either constitute an added-on part relative to the pedal or constitute an integral part of said pedal, manufactured in one operation.

The devices for mounting a pedal according to the invention have the advantage of increasing the safety of the occupants of a vehicle, permitting the driver to allow a residual actuating path of the pedal once it has been detached from its support, following an impact or in a normal driving situation. In spite of this additional function, said devices have the advantage of keeping the same space requirement relative to existing devices. Finally, the simplicity of the operating mechanism of the pedal which has been sheared off confers a high degree of safety and reliability to the devices for mounting according to the invention.

BRIEF DESCRIPTION OF THE DRAWINGS

A detailed description of a preferred embodiment of a device for mounting a pedal according to the invention is provided hereinafter with reference to FIGS. 1 and 3c.

DETAILED DESCRIPTION

Figure 1:
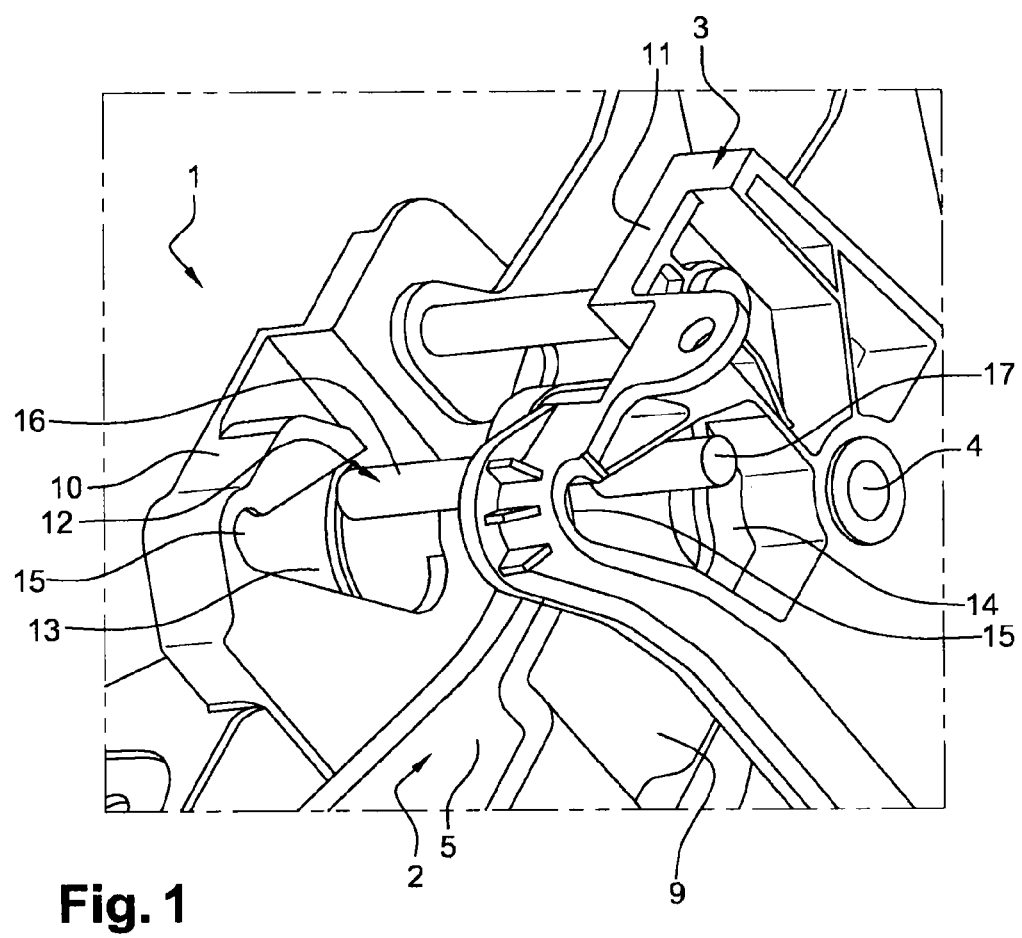
FIG. 1 is a perspective view of the articulated connection of a brake pedal on a support according to a device for mounting according to the invention.
Figure 2:
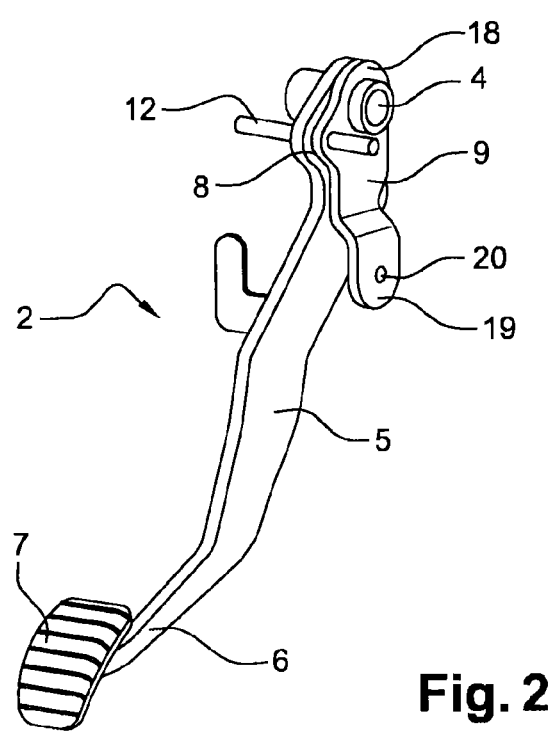
FIG. 2 is a perspective view of a brake pedal according to the invention.

With reference to FIGS. 1 and 2, a device for mounting 1 a brake pedal 2 according to the invention comprises a support 3 on which said brake pedal 2 is mounted by means of a principal rotary shaft 4 and shearing means attached to a fixed bodywork element. The shearing means which may, for example, be similar to those disclosed in the patent EP0965506 comprise two blades, each consisting of two cutting arms arranged in a V-shape. With reference to FIG. 2, the pedal 2 conventionally consists of an elongated lever arm 5, a first end 6 thereof being terminated by a rough-surfaced plate 7, forming the bearing surface against which a driver exerts a pressure with the foot to trigger the braking of the vehicle, and a second end 8 thereof being connected in an articulated manner to the support 3 by means of the principal rotary shaft 4. An interface bracket 9 fixed rigidly to the lever arm 5 of the pedal 2 in the region of its second end 8 is fixed to rigid transmission elements, not visible in the figures, to displace said elements under the action of the rotation of the pedal 2 and to actuate the braking system. Said bracket 9 is planar and of small thickness and extends along a longitudinal axis of the lever arm 5, a first end 18 of said bracket 9 being traversed by the principal rotary shaft 4 and a second end 19 being connected to said rigid transmission elements.

With reference to FIG. 1, which shows the location in which the principal rotary shaft 4 is positioned, said location similarly being denoted by the reference numeral 4, said principal rotary shaft 4 is fixed to two parallel and vertical walls 10, 11 of the support 3, said walls 10, 11 extending in a longitudinal direction of the vehicle. This principal rotary shaft 4, which is preferably made of plastics material so as to be able to be easily sheared off in the case of a front impact, during the intrusion of said support 3, is perpendicular to said walls 10, 11 and thus extends in a transverse direction of said vehicle. In normal operation, a pressure of the foot applied to the plate 7 causes a rotation of the pedal 2 about the principal rotary shaft 4 which causes the displacement of the transmission elements by means of the interface bracket 9, thus activating the braking system of the vehicle. The second end 8 of the lever arm 5 carries a secondary shaft 12 which is preferably made of steel and which is rigidly fixed to said lever arm 5. Each of the two walls 10, 11 of the support 3, carrying the principal rotary shaft 4, is provided with an opening 13, 14 having an approximately triangular shape. Said two openings 13, 14 are identical and are perfectly aligned with one another in a transverse direction of the vehicle. Each of said openings 13, 14 has a rear tapered end 15 of rounded shape, the dimensions thereof being slightly greater than the diameter of the secondary shaft 12. With reference to FIG. 1, when the pedal 2 is mounted on the support 3 between the two walls 10, 11, the secondary shaft 12 is located parallel to the principal rotary shaft 4 and protrudes in the region of its two ends 16, 17 in each of the two openings 13, 14 at the front part of said openings 13, 14. The secondary shaft 12 is located substantially at the same height as the principal rotary shaft 4 and at the rear thereof. With reference to FIGS. 1 and 2, it should be noted that the interface bracket 9 is also traversed by the secondary shaft 12 in the vicinity of its first end 18.

Figure 3A:
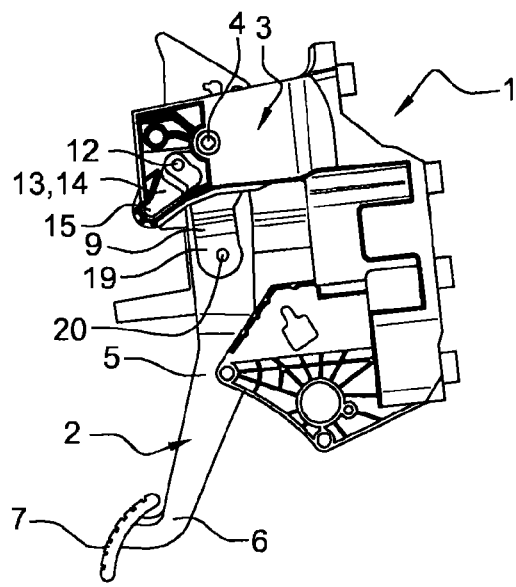
FIG. 3a is side view of the articulated connection of the brake pedal on a support, forming part of a device for mounting according to the invention, during a first operating step in the damaged state.

With reference to FIG. 3a, when a user exerts a pressure on the plate 7 of the brake pedal 2, when the principal rotary shaft 4 has been sheared off in an unexpected manner, said pedal 2 starts to rotate about the point of contact 20 between the second end 19 of the interface bracket 9 and the rigid transmission elements, since the two ends 6, 8 of the lever arm 5 are currently free of any movement. During this preliminary rotational phase, the pedal 2 simply pivots without being able to displace the transmission elements and thus without being able to activate the braking system.

Figure 3B:
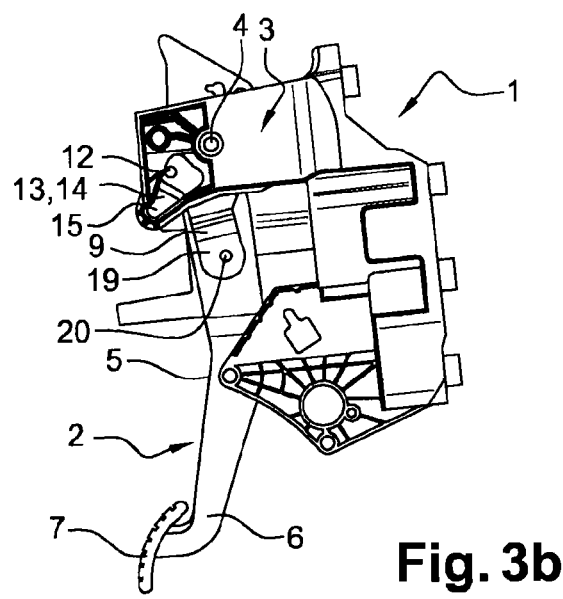
FIG. 3b is a side view of the articulated connection of the brake pedal on a support, forming part of a device for mounting according to the invention, during a second operating step in the damaged state.

With reference to FIG. 3b, when the rotation of the pedal 2 continues, the secondary rotary shaft 12 accompanies the pivoting of the pedal 2 to which it is rigidly fixed, approaching the rounded rear end 15 of said openings 13, 14. During this second rotational phase of the pedal 2, said pedal 2 simply pivots about the point of contact 20 between the second end 19 of the interface bracket 9 and the rigid transmission elements, still without being able to displace said rigid transmission elements and thus without being able to trigger the braking system.

Figure 3C:
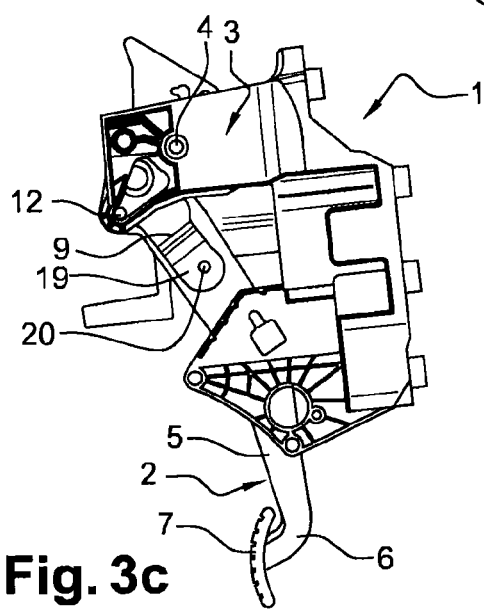
FIG. 3c is a side view of the articulated connection of the brake pedal on a support according to a device for mounting according to the invention, during a third operating step in the damaged state.

With reference to FIG. 3c, the secondary shaft 12 is finally wedged in the two rear and rounded ends 15 of the openings 13, 14 of the two walls 10, 11 of the support 3. By maintaining pressure on the plate 7 of the pedal 2, said pedal 2 continues to pivot but about the secondary shaft 12 which is blocked in translation at the bottom of the rear ends 15 of the two openings 13, 14. A continuation of the rotation about this secondary shaft 12 then produces a thrust on the rigid transmission elements which are finally displaced and activate the braking system.

The rotation about the point of intersection between the second end 19 of the interface bracket 9 and the transmission elements and for which said elements are not displaced corresponds approximately to two thirds of the total path of said pedal 2, whilst the rotation about the secondary shaft 12 and for which the braking system is activated corresponds to a third of said total path.

The invention claimed is:

1. A device for mounting a pedal of a vehicle comprising:
   a support on which a lever arm of the pedal is mounted by a principal rotary shaft to rotate around the principal rotary shaft; and
   shearing means connected to a fixed bodywork element of the vehicle, the shearing means configured to radially shear off the principal shaft in a case of a displacement of the support relative to the bodywork element, to detach the pedal from the support; and
   a secondary shaft which is rigidly fixed to the lever arm of the pedal to rotate with the lever arm of the pedal around the principal rotary shaft, and the secondary shaft is configured to position the pedal, which has been sheared off, in a new operating position,
   wherein the principal shaft joins two parallel and vertical walls of the support, and each of the walls comprises an opening, the secondary shaft protruding into the openings of the walls of the support.

2. The device according to claim 1, wherein the secondary shaft constitutes the new rotary shaft of the pedal in its new operating position.

3. The device according to claim 1, wherein the secondary shaft is parallel to the principal shaft when the pedal is mounted in an articulated manner on the support.

4. The device according to claim 1, wherein each wall extends in a longitudinal direction of the vehicle and the principal shaft and the secondary shaft extend in a transverse direction of the vehicle.

5. The device according to claim 1, wherein the openings of the walls are identical and oppose one another in a transverse direction of the vehicle.

6. The device according to claim 5, wherein each of the openings comprises a blocking end configured to receive the secondary shaft once the principal shaft has been sheared off.

7. The device according to claim 6, wherein the secondary shaft is located behind the principal shaft when the pedal is mounted on the support, and the blocking end of each of the openings is located to the rear of the openings.

8. The device according to claim 1, wherein the principal shaft is made of plastics material and the secondary shaft is made of steel.

9. A pedal configured to be mounted on a motor vehicle support by a device for mounting according to claim 1, comprising the secondary shaft.

10. The device according to claim 1, wherein each of the openings has a tapered end of rounded shape, the dimensions of the rear tapered end being greater than a diameter of the secondary shaft.

* * * * *